United States Patent Office 3,296,493
Patented Jan. 3, 1967

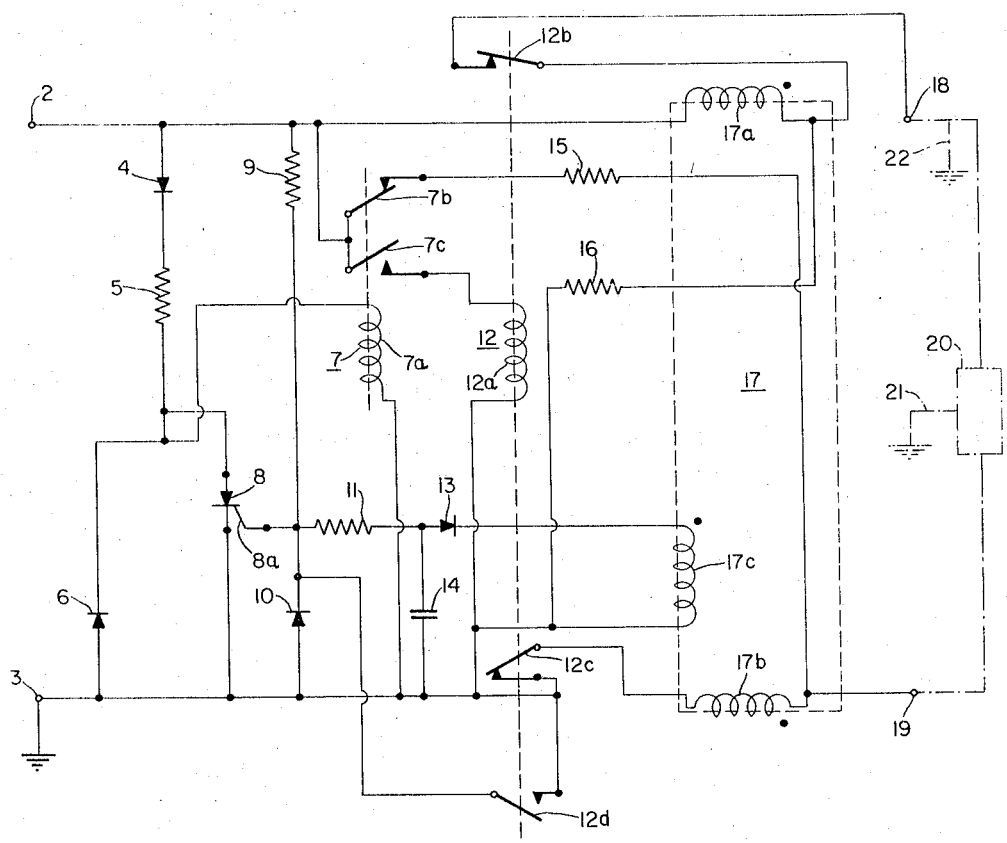

3,296,493
LEAKAGE DETECTION AND CONTROL CIRCUIT
Vernon Whittaker and Edward T. Thomson, Hatboro, Pa., assignors to Automatic Timing and Controls, Inc., King of Prussia, Pa., a corporation of Pennsylvania
Filed Nov. 5, 1964, Ser. No. 409,240
5 Claims. (Cl. 317—18)

This invention relates to a protective circuit and in particular to a protective circuit which responds to differences in the current which passes to and from the load circuit to be protected.

In many industrial and household applications, it is quite important to insure that protection against circuit abnormalities is effected. For example, whirlpool baths used in the treatment of certain bodily disorders employ agitating elements which are electrically driven and immersed in water. Another example of the field of application of this invention is in providing protection for swimmers in pools which have underwater illumination. It is evident that leakage of appreciable amounts of current from the active electrical circuit into the water presents a serious hazard to the user thereof. Accordingly, it is extremely important that protecive circuits be employed with such apparatus and which are sensitive to leakage of current beyond a predetermined maximum level.

It is therefore an object of the present invention to provide a protective circuit which is responsive to quite small abnormal conditions in the load circuit to be protected.

Still another object of the present invention is to provide a relatively simple and sensitive protective circuit which does not constitute an undue power drain.

Other objects of the present invention will be apparent to those skilled in the art upon perusal of the drawings, specification and claims herein.

In accordance with our invention we provide a protective circuit for a load circuit which is designed to detect abnormal current leakages in the load circuit by sensing differences in the current flowing to and from the load circuit. Such differences could be caused, for example, by leakage of current to ground in the load circuit. A transformer is provided having one winding connected on the "hot" side of the load and the other connected in the "ground" line. They are so wound and arranged that under normal conditions in the load circuit currents passing through both windings are the same but in opposite directions so that they do not produce any net magnetic field. The transformer also includes a secondary winding disposed so as to be threaded by any net magnetic fields produced by the primary windings when abnormal load circuit conditions do exist. When a voltage is thus induced in the secondary winding, our protective circuit initially produces a preliminary latching effect and then acts to decouple the load circuit from the input terminals as it simultaneously produces a final latching effect which lasts until the protective circuit is reset.

In one form of the invention the error voltage induced in the secondary winding is used to open a sensitive switch thereby routing current through a first relay solenoid. The first relay operates to redistribute the currents in the primary windings so as to enhance the original disparity therein for preliminary latching purposes. Simultaneously, the first relay actuates a second relay which decouples the load circuit and acts to keep the sensitive switch open permanently until the protective circuit is reset.

The sole figure is a schematic diagram of a highly satisfactory form of our novel protective circuit.

Referring to the sole figure there is shown a protective circuit having input terminals 2 and 3 which are adapted to be connected to a source of voltage such as line voltage. There are also output terminals 18 and 19 across which a load circuit such as is indicated schematically by the broken line rectangle 20 may be connected. One of the main features of this circuit is a transformer 17 which has two identical primary windings 17a and 17b wound upon a common core. One of the windings is on the "hot" side of the load, the other is in the ground line. Also, there is a single secondary winding 17c wound on the same core. Under normal operating conditions, current applied at the input terminal 2 will pass through winding 17a, the load 20, winding 17b and to ground via terminal 3. Since this current will pass through the primary windings in opposite directions, equal and opposite magnetic fields will be produced thereby so that no net field will be produced within the common core. Therefore no voltage will be induced into the secondary winding 17c.

However, if there should be leakage current to ground as shown by the broken line 22 or the broken line 21, that leakage current will have flowed through the primary 17a but will not have flowed through the primary 17b. This causes an imbalance by the amount of the leakage current so that there will be a greater field produced by winding 17a than winding 17b. The net magnetic differential field will induce a voltage in secondary winding 17c which is used to initiate operation of this protective circuit in the manner now to be described.

There is connected between terminals 2 and 3 a series circuit consisting of diode 4, resistor 5, and three circuits which branch therefrom. The first branch consists of diode 6 and the second consists of a silicon controlled switch 8. The switch 8 which may be, for example, a type 3N58, is effectively in parallel with the secondary winding 17c. It is a four-layer, semi-conductive device having a gate electrode 8a. When the electrode 8a of the switch is positive with respect to its cathode, current will flow in the normal direction from its anode to its cathode. When the electrode 8a is negative with respect to its cathode, no current passes through the switch 8.

During normal operation of this circuit, when terminal 2 is positive with respect to terminal 3, there is a voltage applied to electrode 8a through the voltage dividing network consisting of resistors 9 and 11. When the secondary 17c has no voltage induced therein, the voltage at electrode 8a will be positive thereby enabling the switch 8 to conduct in a forward direction. This current will flow through diode 4, resistor 5, and the switch 8 thereby effectively by-passing current around the solenoid 7a of a relay 7 which is in a third branching circuit connected to resistor 5. The relay 7 having associated arms 7b and 7c is constructed to respond when switch 8 is rendered non-conductive because of voltages induced in secondary 17c in a manner to be described later.

In normal operation, when the terminal 2 is negative with respect to terminal 3, were it not for the presence of diode 4, current would flow through diode 6 and resistor 5 thus by-passing relay 7. However, the presence of diode 4 blocks this reverse current through resistor 5 reducing the heat dissipated therein.

Should there be leakage of current to ground in the load circuit as shown by the dashed lines 22 or 21, the voltage induced in secondary 17c is an alternating current voltage whose phase is determined by the power factor of the leakage path. So as to prevent this power factor from affecting operation of this circuit, a diode 13 is provided which rectifies leakage voltage so that current only flows through diode 13 when its cathode is negative. This causes a voltage which is negative with respect to the cathode of switch 8 to appear on the anode of diode 13 (and on the ungrounded plate of capacitor 14). Throughout the range of leakage currents which would cause triggering of the circuit, the voltage level will be approximately proportional to the leakage current. When terminal 2 is positive, the voltage on gate electrode 8a will remain negative if the voltage on the anode of diode 13 is greater than the ratio of the resistance of resistor 11 to the resistance of resistor 9 times the peak line voltage at terminal 2. If this negative voltage condition exists, the switch 8 opens and current is diverted through solenoid 7a actuating the arms 7b and 7c to move to their opposite positions.

When solenoid 7a is thus energized, it causes a preliminary latching action to be produced in this circuit. Under normal operating conditions, (before relay 7 is actuated), part of the current from terminal 2 passes through current-limiting resistor 15 and through primary windings 17b. This current is balanced by an equal current which passes through current-limiting resistor 16 and primary winding 17. Thus the balance of currents through windings 17a and 17b is preserved and no net magnetic field is produced which could induce voltage in secondary 17c. Upon actuation of relay 7, however, the movement of arm 7b prevents current flow through resistor 15. Thus, even more current will flow through winding 17a and even less will flow through winding 17b. Consequently, whatever imbalance is caused in the currents flowing through the primary windings because of the existence of leakage currents is considerably augmented by the additional imbalance produced by operation of relay 7. This imbalance, in turn, will cause an even higher voltage to be induced in winding 17c thereby tending to lock-in the circuit.

While movement of the arm 7b deenergizes the circuit containing resistor 15, corresponding movement of arm 7c causes solenoid 12a of relay 12 to be energized. As may be seen from the sole figure, energization of solenoid 12a will move arms 12b and 12c away from their associated contacts thereby decoupling the load 20 from the input terminals 2 and 3. At the same time, the arm 12d is moved to the "make" or closed position. This shorts out the gate electrode 8a and the voltage on electrode 8a cannot go positive thereby maintaining the switch 8 in its open circuit condition until the circuit fault is remedied. The diode 10 is inserted merely to prevent excessive negative voltages from being applied to the electrode 8a which might otherwise harm the switch 8.

In summary, then, when an induced voltage of a predetermined polarity and intensity is present in winding 17c, it opens switch 8 thereby actuating relay 7. The latter thereupon (1) produces a further imbalance of currents through windings 17a and 17b to produce a preliminary latching action and simultaneously (2) energizes relay 12 which (1) decouples the load circuit from the input circuit and (2) produces a final latching action by applying a disabling potential to the control electrode of switch 8.

In the circuit made as shown in the sole figure the following values of the components used therein were found to give highly satisfactory results.

| Component No: | Value or description |
|---|---|
| 4 | 1N538. |
| 5 | 1000 ohms, 10 watts. |
| 6 | 1N538. |
| 7 | Potter-Brumfield Type KA5D, SPDT, 12 v. D.C. |
| 8 | 3N58. |
| 9 | 10 megohms. |
| 10 | 1N34. |
| 11 | 220,000 ohms. |
| 12 | Potter-Brumfield Type KRP11DG, DPDT, 115 v. A.C. |
| 13 | 1N34. |
| 14 | .1 microfarad. |
| 15, 16 | 15,000 ohms, 1 watt. |

We claim:
1. A protective circuit for a load circuit comprising:
   (a) inductive means comprising:
      (i) a first winding coupled between a first input terminal to said protective circuit and a first output terminal thereof,
      (ii) a second winding coupled between a second input terminal to said protective circuit and a second output terminal thereof, said load circuit being adapted to be connected between said output terminals and said input terminals being arranged to be connected to a voltage source, said first and second windings being arranged to produce opposite magnetic fields tending substantially to cancel one another when said load circuit is operating under normal conditions,
      (iii) a third winding disposed so as to be threaded by at least part of the respective magnetic fields produced by said first and second windings,
   (b) first switching means coupled between said input terminals,
   (c) second switching means being coupled to said first input terminal via said first switching means and also being coupled to said second input terminal, said second switching means including means for decoupling said output terminals from said input terminals, and
   (d) third switching means coupled between said input terminals and to said third winding, said third switching means being closed when said third winding has no voltage induced therein by fields produced by said first and second windings thereby bypassing said first switching means, said third switching means being constructed to open in the presence of a predetermined amount of voltage induced in said third winding thereby enabling actuation of said first switching means by said voltage source, said first switching means thereupon actuating said second switching means so as to decouple said load circuit from said input terminals.

2. The protective circuit according to claim 1 wherein said second switching means includes means coupled to said third switching means to maintain the latter in its open condition when said second switching means has operated to decouple said load circuit from said input terminals.

3. The protective circuit according to claim 1 with the addition of balancing means comprising a first circuit connected to said first input terminal via said first switching means and to said second output terminal for bypassing a predetermined amount of current from said source around said first winding and also comprising a second circuit coupled between said first output terminal and said second input terminal for bypassing a predetermined amount of current traversing said first winding around said second winding and wherein said first switching means when actuated is constructed to open said first circuit thereby unbalancing the currents traversing said first and second windings respectively, said unbalancing producing a correspondingly greater induced voltage in said third winding.

4. The invention according to claim 1 wherein said third switching means comprises a semiconductive device having a control electrode and wherein means are provided coupled to said input terminals for biassing said control electrode so as to render said device highly conductive during normal operation of said load circuit.

5. A protective circuit for a load circuit comprising:
   (a) inductive means comprising:
      (i) a first winding coupled between a first input terminal to said protective circuit and a first output terminal thereof,
      (ii) a second winding coupled between a second input terminal to said protective circuit and a second output terminal thereof, said input terminals being adapted to be connected to a voltage source and said output terminals being adapted to be connected to a load circuit to be protected, said first and second windings being arranged to produce opposite magnetic fields tending substantially to cancel one another when said load circuit is operating under normal conditions,
 (iii) a third winding disposed to be threaded by the net magnetic field produced by said first and second windings,
(b) a unidirectional current device having one terminal thereof coupled to said first input terminal,
(c) a first magnetic switching means coupled to said unidirectional current device and to said second input terminal,
(d) a second unidirectional current device coupled between said second input terminal and said first unidirectional current device, said second device being constructed to normally pass current in a direction opposite to current passed by said first device,
(e) a second magnetic switching means coupled to said first input terminal via said first switching means and to said second input terminal, said second means including means for decoupling said output terminals from said input terminals when said second means is actuated,
(f) a semiconductive unidirectional current device having one terminal thereof connected between said first and second devices and the other terminal thereof coupled to said second input terminal, said semiconductive device including a control electrode coupled to one terminal of said third winding,
(g) means coupled between said first and second input terminals for biasing said control electrode during normal operation of said load circuit so as to render said semiconductive device highly conductive, said third winding being constructed to apply an opposite voltage to said control electrode when said net magnetic field induces a voltage therein in excess of a predetermined value thereby rendering said semiconductive device nonconductive, said control electrode also being adapted to be coupled to said second electrode via said second magnetic switching means in response to actuation thereof, a first circuit connected to said first input terminal via said first switching means and to said second output terminal for bypassing current from said source around said first winding when said load circuit is operating normally,
(h) a second circuit coupled to said first output terminal and to said second input terminal for bypassing current traversing said first winding around said second winding during normal operation of said load circuit, said bypassed currents normally balancing one another, said first circuit being opened in response to actuation of said first switching means when said semiconductive device is rendered nonconductive thereby upsetting the balance between the currents in said first and second circuits whereupon the voltage induced in said third winding is augmented thereby tending to latch said semiconductive device in a non-conductive condition.

References Cited by the Examiner
UNITED STATES PATENTS
3,252,052   5/1966   Nash _____ 317—33 X MILTON O. HIRSHFIELD, *Primary Examiner.*

J. D. TRAMMELL, *Assistant Examiner.*